United States Patent
Diebold et al.

(10) Patent No.: US 7,668,633 B2
(45) Date of Patent: Feb. 23, 2010

(54) ELECTRONIC CONTROL SYSTEM FOR A VEHICLE AND METHOD FOR DETERMINING AT LEAST ONE DRIVER-INDEPENDENT INTERVENTION IN A VEHICLE SYSTEM

(75) Inventors: Jürgen Diebold, Eschborn (DE); Michael Klug, Langen (DE)

(73) Assignee: Continental Tevas AG & Co. oHG, Frankfurt (DE)

(*) Notice: Subject to any disclaimer, the term of this patent is extended or adjusted under 35 U.S.C. 154(b) by 872 days.

(21) Appl. No.: 10/550,315

(22) PCT Filed: Mar. 26, 2004

(86) PCT No.: PCT/EP2004/050384
§ 371 (c)(1),
(2), (4) Date: Sep. 22, 2005

(87) PCT Pub. No.: WO2004/085220
PCT Pub. Date: Oct. 7, 2004

(65) Prior Publication Data
US 2006/0195231 A1    Aug. 31, 2006

(30) Foreign Application Priority Data
Mar. 26, 2003   (DE) ................................ 103 13 650

(51) Int. Cl.
*G05D 1/00* (2006.01)
(52) U.S. Cl. .............................. 701/36; 701/45; 701/70; 701/78; 701/83
(58) Field of Classification Search ............ 701/1, 701/36, 45, 46, 47, 70, 78, 83, 96; 340/905, 340/936, 436, 939
See application file for complete search history.

(56) References Cited

U.S. PATENT DOCUMENTS

| | | | |
|---|---|---|---|
| 7,236,419 B2 * | 6/2007 | Ishikawa et al. | 365/226 |
| 7,489,994 B2 * | 2/2009 | Isono et al. | 701/36 |
| 7,496,436 B2 * | 2/2009 | Galkowski et al. | 701/41 |
| 7,509,194 B2 * | 3/2009 | Wheals et al. | 701/36 |

FOREIGN PATENT DOCUMENTS

| | | |
|---|---|---|
| DE | 4338068 | 3/1995 |
| DE | 4413172 | 3/1995 |
| DE | 19916267 | 10/2000 |
| DE | 10060498 | 10/2001 |
| DE | 10103401 | 8/2002 |
| DE | 10121386 | 8/2002 |
| EP | 0976627 | 2/2000 |
| WO | 03006289 | 1/2003 |

* cited by examiner

Primary Examiner—Richard M. Camby

(57) ABSTRACT

In a method for determining at least one, preferably however several driver-independent interventions in a vehicle system, a risk calculator is used, whose input is supplied with predetermined vehicle data, ambience data, current vehicle and driver data, occupant data or data of persons outside the vehicle, or similar data. The risk calculator issues an evaluation of the risk situation of the vehicle and its occupants or the persons outside the vehicle based on said data and, in accordance with the evaluation and optional additional criteria or weightings, outputs driving signals controlling actuators that modify or trigger the driving behavior of the vehicle and/or the occupant protection system and/or protection means for other traffic participants (pedestrians, cyclists, etc.) in such a way that maximum protection is obtained for the persons and the vehicle according to a priority control.

22 Claims, 9 Drawing Sheets

ELECTRONIC CONTROL SYSTEM FOR A VEHICLE AND METHOD FOR DETERMINING AT LEAST ONE DRIVER-INDEPENDENT INTERVENTION IN A VEHICLE SYSTEM

BACKGROUND OF THE INVENTION

The present invention relates to an electronic control system for a vehicle and a method for determining at least one driver-independent intervention in a vehicle system. The invention particularly relates to a method for avoiding accidents and injuries by the integration of the active and passive safety means and the active driving dynamics control in an electronic control system of a vehicle.

In the past, passive safety systems for avoiding any injuries induced by accidents have mainly been developed separately and independently of active safety systems for avoiding accidents.

The first major improvements of passive safety in the middle of the sixties implying the safety passenger cell, the three-point seat belt, up to the later development of the deformation zone, did not yet represent a break-through in the improvement of active safety. It was only with the wide spreading of ABS at the beginning of the eighties that the foundation for active electronic safety systems was formed.

Since then, electronically controlled systems such as ESP driving dynamics control systems, ACC, seat-belt tensioning devices, and airbags are being employed for active and passive safety.

The entire potential of the individual systems is, however, fully utilized only if the systems are interconnected in a network and data about the driving condition, the vehicle's ambience and the driver himself is available to all subsystems. The idea of a network has been realized in a first step in the project Reduced Stopping Distance ('Reduced Stopping Distance RSD, title '30 m car', Continental group of companies, December 2000) in the field of active safety systems. A specific brake tire serves as the basis for shortening the stopping distance, which, due to its bionomical structure, will not only increase its wheel contact area when a brake force is applied but also ensure a homogeneous distribution of the forces in the tire contact area. This fact increases the maximum possible deceleration to roughly 1.3 g with optimal road conditions. To be able to transmit this high brake torque onto the road in the case of an emergency braking, intervention in the shock absorbers is necessary to dampen the pitch oscillation induced by the impact of braking in the direction of aperiodicity. This provides the ABS with better control conditions and renders it more efficient. The average transmissible brake torque is increased by the minimized wheel load fluctuations. In particular when a wheel encounters slip at the beginning of the emergency braking operation, the network connection between the adjustable dampers and the ABS control allows adjusting the optimum of wheel slip with a higher rate of accuracy.

The entire stopping maneuver is furthermore shortened by the quicker pressure increase that is possible due to the use of an electrohydraulic brake system (EHB). In this arrangement, the application of the brake pedal is analyzed, and the pressure out of a pressure accumulator is fed into the brake system assisted by a brake assist system (BA). This allows reducing the threshold time and, thus, shortening the travel that is covered from the point of time of the first brake pedal contact until the full development of the braking power.

The network connection has been extended in the following improvement by integrating ambience data. A 77 GHz radar sensor or a LIDAR distance sensor included in the Adaptive Cruise Control (ACC) supplies the distance and relative speed of the vehicles in front of one's own vehicle. The comfort-oriented ACC control uses this data to permit the driver relaxed and non-tiring driving relieved from routine tasks (distance-keeping).

An activated ACC system, however, also enhances safety for an inattentive driver. The ACC system recognizes a dangerous situation and initiates an independent braking maneuver at a critical distance and a relative speed until the allowed limit of 2 to 3 $m/s^2$. If this deceleration is insufficient to avoid a collision, the driver is warned by a signal and requested to perform a braking maneuver.

This provision will shorten the travel any inattentive driver covers until he has recognized the risk and starts to reposition his foot to depress the brake pedal.

With the consequent linking of distance sensor and brake system, this shortening of the reaction travel can also be used when the ACC system is deactivated. When the driver takes over to perform the braking maneuver in this dangerous situation, the extended brake assist system (BA+) will support the driver in the further brake pressure buildup.

DE 198 06 687 A1 discloses a method for preventing a collision of a vehicle with an object positioned in front of the vehicle. In this arrangement, the distance and the relative speed between the vehicle and obstacle and the speed and the acceleration or deceleration of the vehicle are detected, and collision indications or braking operations are initiated depending thereon. As this occurs, a braking operation shall only be initiated when the sensed distance is shorter than two calculated distances. One calculated distance represents a minimum distance which allows avoiding a collision at a maximum deceleration, while the other distance is meant to allow directing the vehicle past the object.

Further, WO 03/006289 discloses a method for the automatic activation of a deceleration of a vehicle for preventing a collision with another object, wherein depending on radar or Lidar signals or video signals, objects in the range of the vehicle's course are detected and motional quantities of the vehicle are sensed. A risk potential shall be determined depending on the object detected and the motional quantities. According to this risk potential, the means of deceleration shall be operated in at least three conditions. In addition, it is envisaged to diminish the consequences of an imminent collision with another object by activating passive or active restraint systems.

SUMMARY OF THE INVENTION

An object of the invention is to provide an electronic control system and a method for preventing a collision and/or for avoiding the consequences of a collision with an object, which method prevents erroneous interventions or faulty control activations contrary to the driver's judgment and nevertheless supports the driver optimally in dangerous driving situations and takes necessary protective measures.

According to the invention, this object is achieved in that a generic electronic control system for a vehicle is configured in such a fashion that the control system comprises a driver request module for determining characteristic quantities with respect to a driver's request from data at least representative of pedal travels, movements of the foot changing between the pedals, and the brake pressure of the brake system, and a risk calculator for determining the risk potentials from predefined and current vehicle data and additional data, such as ambience data and driver data, and optionally data of persons inside and outside the vehicle, and similar data, and the risk calculator performs at least one assessment of the condition of danger of the vehicle and the occupants in the vehicle and, in case of need, of the ambience still and, depending on the assessment and on further criteria or weightings, outputs controlling interventions graded according to the risk potential to an arbitration unit for controlling actuators, and said arbitration unit performs an assessment with the data determined in the driver request module with regard to the driver's request at least depending on an action influencing the driving dynamics of the vehicle brought about by the controlling interventions, and, depending on the result of the assessment, releases the graded controlling interventions to a limited extent, releases or blocks them.

Further, the object is achieved in that a generic method for determining at least one driver-independent intervention in a vehicle system is performed in such a manner that in a driver request module for determining characteristic quantities with respect to the driver's request, a driver's request is determined from data at least representative of pedal travels, movements of the foot changing between the pedals, and the brake pressure of the brake system, and risk potentials are determined in a risk calculator from predefined and current vehicle data and additional data, such as ambience data and driver data, and optionally data of persons inside and outside the vehicle, and similar data, and the risk calculator performs at least one assessment of the condition of danger of the vehicle and the occupants in the vehicle and, in case of need, of the ambience still and, depending on the assessment and on further criteria or weightings, outputs controlling interventions graded according to the risk potential to an arbitration unit for controlling actuators, and said arbitration unit performs an assessment with the data determined in the driver request module with regard to the driver's request depending on an action influencing the driving dynamics of the vehicle brought about by the controlling interventions, and depending on the result of the assessment, releases the graded controlling interventions to a limited extent, releases or blocks them.

The control system of the invention and the method of the invention, in an actual and/or alleged accident situation, is used to determine in a risk calculator risk potentials for persons inside and/or outside the vehicle, for the vehicle or objects, from data comprising predetermined and current vehicle data, ambience data and driver data as well as additional data such as data of persons inside and outside the vehicle, and similar data. Further, the driver's request is determined in a driver request module from pedal travels, movements of the foot changing between the pedals, and brake pressures of the brake system and further quantities or conditions, such as steering angle variations, accelerator pedal travels, brake lights on/off, and/or derivatives of the previous data and quantities. Basic driver requests may be acceleration or deceleration and/or a change of the driving direction. From the correlation of the data representative of the driver's request and the risk potentials, controlling interventions for the actuators of a vehicle being determined in the risk calculator are released to a limited extent, released or blocked in an arbitration unit.

The release to a limited extent implies controlling interventions of selected actuators, while controlling interventions of other actuators which are simultaneously output by the risk calculator are blocked or suppressed, respectively.

Due to the estimation or assessment of the risk for persons and objects and the correlation of this estimation or assessment with the actual request of the driver regarding his driving behavior in the estimated or assessed danger situation, it is possible to suppress by control technique, modify or proportionately release (e.g. a controlling intervention in the brakes of 40 bar is reduced to a brake pressure of 20 bar) or release controlling interventions for actuators which are produced resulting from current driving situations with risk potential. The danger situation is estimated by the risk calculator in a 'driver-adaptive' fashion so that the controlling interventions are executed, blocked or modified depending on the risk potential determined and on the driver's request.

Controlling interventions can only be released depending on the risk potential, without being arbitrated with respect to the driver's request. In this arrangement, the influence which this intervention has on the driving dynamics is one criterion for disregarding the driver's request.

Advantageously, different risk potentials are determined in the risk calculator and suitably combined for producing controlling interventions, and one risk potential is calculated by means of a fuzzy system. The controlling interventions are then adapted to the driver's request, what is expediently realized in a state machine. To be able to comprehensively assess the complex driving situation, risk potentials are produced with respect to different ranges of application. With regard to the risk potentials, a distinction is made between general potentials and special potentials. A general risk potential implies actuator-independent potentials such as risk potentials from ambience data and vehicle data assessing the longitudinal-dynamics criticality of the driving situation.

A special risk potential implies actuator-related potentials such as a risk potential evaluating the driving situation based on sensor data, vehicle data, and actuator-related characteristic quantities such as activation times.

The risk calculator, whose input is supplied with predetermined vehicle data, ambience data, current vehicle and driver data, data of persons inside and outside the vehicle, and similar data, performs an assessment of the condition of risks of the vehicle and the persons inside and outside the vehicle. Depending on the assessment and optional additional criteria or weightings, the risk calculator outputs graded controlling interventions or actuating signals which control actuators changing or triggering the driving performance of the vehicle and/or the passenger protection and/or haptic and/or optical and/or acoustical risk feedbacks and/or additional reversible/non-reversible adjustment actuators and/or protection means for other traffic participants (pedestrians, cyclists, etc.) in such a way that maximum protection is obtained for the persons and the vehicle according to a priority control.

Depending on the determined risk potential and other characteristic quantities, the priority control defines how the graded controlling interventions are prioritized.

Advantageously, the repositioning movement of the foot from the accelerator pedal to the brake pedal is determined from information about the accelerator pedal travel and the brake light information as input quantities of the driver request module. The time of repositioning the foot from one pedal to the other is determined from these two input quantities.

At least one braking request is determined from the data in the driver request module and made available to the subsequent arbitration unit. Apart from the braking request, appropriately, a steering request and/or an acceleration request is determined from additional data in the driver request module and sent to the subsequent arbitration unit.

To determine the risk potential, the risk calculator is supplied with input data of vehicle systems, such as ambience systems, seat adjustments, safety-belt tensioning systems, pedal travel sensors, and/or driving dynamics control systems (ESP, ABS, ACC, BA), and like systems. According to the invention, the risk calculator calculates risk potentials from data representing at least the vehicle longitudinal speed, the vehicle longitudinal acceleration, the vehicle lateral acceleration, the distances from relevant objects in the local range and/or the remote range and/or their derivatives and state data about driving dynamics controllers such as ABS, HBA, ESP, and like systems, said risk potentials, at least in dependence on determined longitudinal-dynamics and/or lateral-dynamics risk characteristic quantities, producing correction variables graded in their effect and dependent on the determined risk potential for the brakes, the reversible occupant protection means and for the adjusting devices that change the relative position between occupant protection means and vehicle occupants.

By means of the ambience system, the risk calculator can use the information of the distance sensors to purposefully condition the passive safety measures in addition to the active safety systems. As this occurs, the non-reversible occupant protection means are pre-conditioned, that means, additional data is provided by the risk calculator. This information can be used to modify activation thresholds. The occupants' risk of injury is reduced, and the seriousness and frequency of an accident decreases. With the development of a pre-crash sensor (Closing Velocity—VC) and the integration of the CV function in a radar and/or infrared sensor, the time prior to an accident is used to include the gravity of an accident to be expected and the estimated direction of impact in the intervention strategy of the actuators such as the release strategy of the airbags. Apart from improving the occupant protection, the CV sensor is also used to detect pedestrians. It offers the possibility of achieving a protection for pedestrians along with an additional plausibilisation by way of low-g acceleration sensors (satellites).

The safety gained by the electronic control system and the method can be achieved by the network connection of the components and by the central estimation of the likelihood of accidents using the data of the network systems. The control system and the method found on the basic idea of the data exchange among safety systems having data about the driver, the vehicle and the surroundings of the vehicle. It is not only an extra value for the driver that is aimed at by way of realizing new functions with components already provided, in addition, costs are reduced by the network connection of the available components.

The central and linking part of the software is the risk calculator where all pieces of data in the vehicle are gathered. The ambience data is fused therein, and all data is analyzed. According to a preferred embodiment, the ambience data fusion can also take place in a separate module which is connected upstream of the risk calculator and provides it with fused ambience data as relevant data for a safety system. A risk potential mirroring the instantaneous likelihood of an accident is determined for the current driving situation. When the risk potential rises, measures are gradually taken, starting from information and warnings for the driver until the activation of reversible restraint systems.

Ambience sensors provide a major contribution in this respect. They allow the expedient use of reversible measures for the passive safety.

Another step in the direction of gaining greater safety is taken by introducing picture-processing camera systems. This provision renders it possible for the first time to classify the objects in addition to the detection of objects. Combined braking and steering interventions will assist the driver in the accident prevention.

The passive safety is enhanced and the risk of injury for the vehicle occupants is minimized when the risk calculator actuates the electric seat adjustment. Submarining is definitely counteracted, while likewise a distance between the co-driver and the airbag that is not optimal is corrected. For the necessary actuation, the risk calculator procures information about the driving situation in the simplest case from the control conditions of the installed active safety systems such as ESP, BA and Active Rollover Prevention (ARP).

In addition, the risk calculator can generate controller outputs for closing openings in the vehicle in order to further improve the passive safety depending on the determined risk potential. Preferably, the windows and the sliding roof are closed when an accident is imminent. With the risk potential continuing to rise and a crash being imminent, the vehicle occupants are secured and positioned by way of an electromotive, reversible seat-belt tensioning device. The vehicle occupants participate earlier in the vehicle deceleration due to the belt slack being reduced. Also, the occupants' risk of injury will further decrease.

Advantageously, optical and/or haptic warnings and/or directions or instructions are provided how to warn and/or guide the driver to a reaction that is adapted to the current vehicle situation. The warnings are given preferably by means of a vibrating pedal and/or seat and/or a display.

The directions are given by means of a modified control force on at least one pedal and/or the steering wheel so that the driver is induced by the increasing or decreasing control force to steer the vehicle in conformity with the situation.

The actual functions of the risk calculator are mainly the
1. calculation of characteristic quantities related to driving dynamics
2. calculation of risk potentials
3. calculation of the actuating signals (universally valid quantity—not the actual actuator driving signal) due to the risk potentials.

Thus, a level of abstraction is defined which assesses the situation in an appropriate manner. This level is realized by the risk potentials. The risk potential is a dimensionless quantity ranging between 0 and 100. The higher the risk potential is, the more dangerous the situation. The actuators are driven only due to inquiries of the risk potentials with respect to threshold values. Several risk potentials can be combined in order to activate an actuator. This means that the assessment of the state initially does not comprise the selection or proportioning of the actuation of the actuators. In this arrangement, a certain situation is assessed by several risk potentials. This allows a more comprehensive assessment of the situation. There are risk potentials which assess the situation irrespective of the actuator means. For example, there may be a risk potential assessing the longitudinal-dynamics driving condition. Accordingly, there is a universally valid risk potential describing the lateral-dynamics driving condition. In contrast to these universally valid risk potentials, there are special risk potentials adjusted to defined actuators. These risk potentials take the fact into account that different actuators have different activation times. This means that the same situation is comparatively more critical for an actuator having a long activation time than for an actuator having a short activation time.

Hence, there are universally valid risk potentials and risk potentials especially set up for actuators.

The arbitration unit provided in the electronic control system preferably includes a state machine which arbitrates the behavior of the driver by way of quantities representing the accelerator pedal travel, the accelerator pedal speed, and the time of the foot repositioning between the accelerator pedal and the brake pedal and/or the condition (on/off) of the brake light and/or measured and/or calculated brake pressures of the brake system and/or the vehicle acceleration and/or their derivatives in correlation to an actuation quantity depending on the risk potentials and releases brake pressure specifications of the risk calculator in dependence on the result. Depending on the development of the risk potential (value and/or gradient), the controlling intervention, such as a braking intervention, can also take place autonomously, meaning in contrast to the driver's request. The autonomous controlling intervention, such as a braking intervention, is limited with respect to the value of the controller output, such as braking pressure.

Depending on the condition of the arbitration unit, controlling interventions for the deceleration devices of the vehicle are then made available which comprise different brake pressure requests reaching from prefilling the brake system to reduce the response time up to the introduction of maximum brake pressure.

To this end, the state machine assesses the behavior of the driver and, depending on the assessment, releases brake pressure specifications of the risk calculator. Mainly the movement of the driver's foot is assessed. This movement allows conclusions as to how dangerous the driver assesses the same situation to be or whether he has detected a critical situation at all. Only when the driver confirms this critical situation will brake pressure be built up irrespective of the driver. Four stages are distinguished in this regard:

1. not supported: The driver shows his wish to accelerate by way of a positive time gradient on the accelerator pedal. Even if the risk calculator detects a critical situation, brake pressure is not built up autonomously in this condition pmax=0 bar.
2. prefill: This level defines a condition where the deceleration request of the driver can be defined only within limits or does not yet exist. The driver must touch the accelerator pedal in this condition. There are two subordinated conditions:
   a) prefill 1: The calculated risk potential has a time gradient lying above a defined threshold. The driver does not change his accelerator pedal position. This situation is interpreted as an extreme aggravation of the risk situation so that a brake pressure of maximally p1max=k1 bar is admitted without active actuation of the driver. This causes application of the brake pads without any remarkable deceleration of the vehicle.
   b) prefill 2: When the driver confirms the critical situation by leaving the accelerator pedal (negative time gradient on the accelerator pedal), a maximum brake pressure of p2max>p1max is allowed. This causes a low deceleration of the vehicle of 0.1 to 0.2 g.
3. prebrake: The driver has applied neither the accelerator pedal nor the brake pedal in this condition. Therefore, this condition is interpreted as a limited deceleration request. The maximum deceleration is thus raised to roughly the legally admissible level (0.3 g) so that a maximum brake pressure of p3max>p2max can be achieved.
4. extended brake assist: With the transition into this condition, the driver confirms his deceleration request by applying the brake pedal. If additional conditions are fulfilled now, the brake pressure predetermined by the risk calculator is released depending on the degree of this fulfillment.

These conditions are as follows:
An emergency situation is derived from
a) the time variation of the brake pressure and the brake light information and
b) the time variation of the risk potential.

When the emergency situation is detected, the brake pressure calculated by the risk calculator is totally conducted as a nominal value to the brake system. The driver receives maximum support. If, however, no emergency situation is detected, a characteristic factor is determined representative of the degree of the braking request of the driver. This factor is composed of three components included in a defined weighting ratio:

a) Ratio of the brake pedal travel to the maximum of the brake pedal travel which depends on the pressure in the system (represented by the wheel brake pressure) or ratio of the brake pressure to the maximum of the brake pressure of the brake system. This is necessary because the driver senses the brake pressure in the system in case the latter system should be prefilled.
b) Ratio of brake pedal speed to the maximum of the brake pedal speed or ratio of brake pressure variation to the maximum of the brake pressure variation. This maximum is independent of the degree of the system's prefilling in approximation.
c) Factor assessing the time of repositioning the foot between the accelerator pedal and the brake pedal.

In this condition, the driver is given a brake assist adapted to the situation by releasing the brake pressure that is determined in the risk calculator.

The specific configuration depends on the equipment of the vehicle. Therefore, the electronic control system and the method of operating the control system preferably has a modular design so that modules for the active safety systems ABS, ESP, TCS, and the like, and the risk calculator are able to calculate in parallel and separately deceleration requests and additional controlling interventions.

Taking into account additional input quantities to determine further risk potentials that improve and describe the assessment of the risk situation with greater precision.

Extension capability for the additional actuation of new actuators by the introduction of new or the use of known risk potentials.

Release of the controlling interventions determined by the risk calculator (virtual co-driver) depending on the driver's assessment of the situation and/or of additional quantities for the assessment of the current traffic situation such as vehicle-vehicle communication. Thus, faults in the sensors do not have major effects on the system behavior or are limited in their consequences. The driver depicts a plausibilisation for the controlling interventions demanded by the risk calculator.

An embodiment of the invention is illustrated in the accompanying drawings and will be described in detail in the following.

DETAILED DESCRIPTION OF THE DRAWINGS

Figure 1:
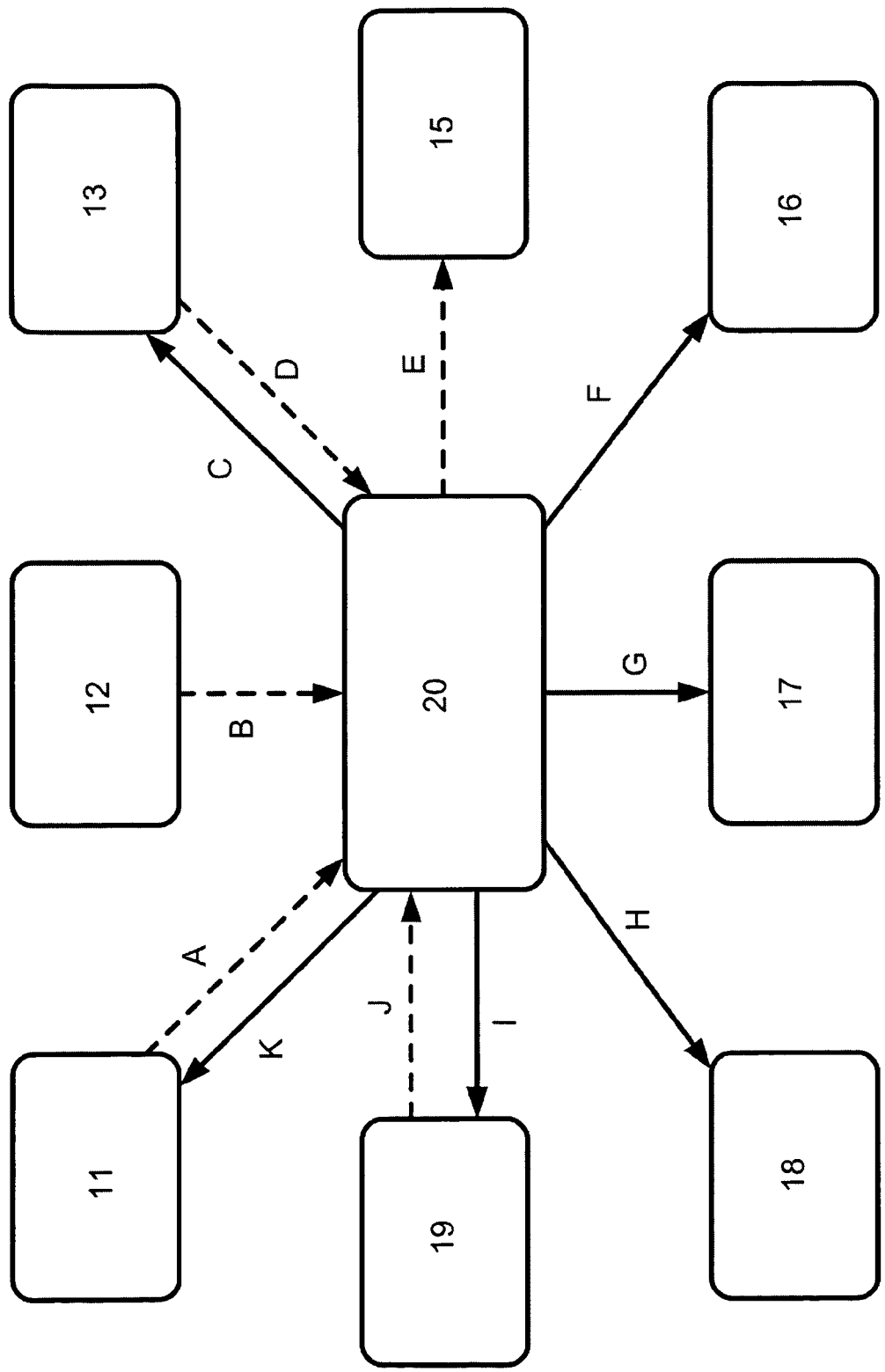
FIG. 1 is a state illustration showing the network connection of the active and passive vehicle systems with the electronic control system of the invention.

FIG. 1 shows the total system of a vehicle linked to the electronic control system 20 in a network.

Figure 2:
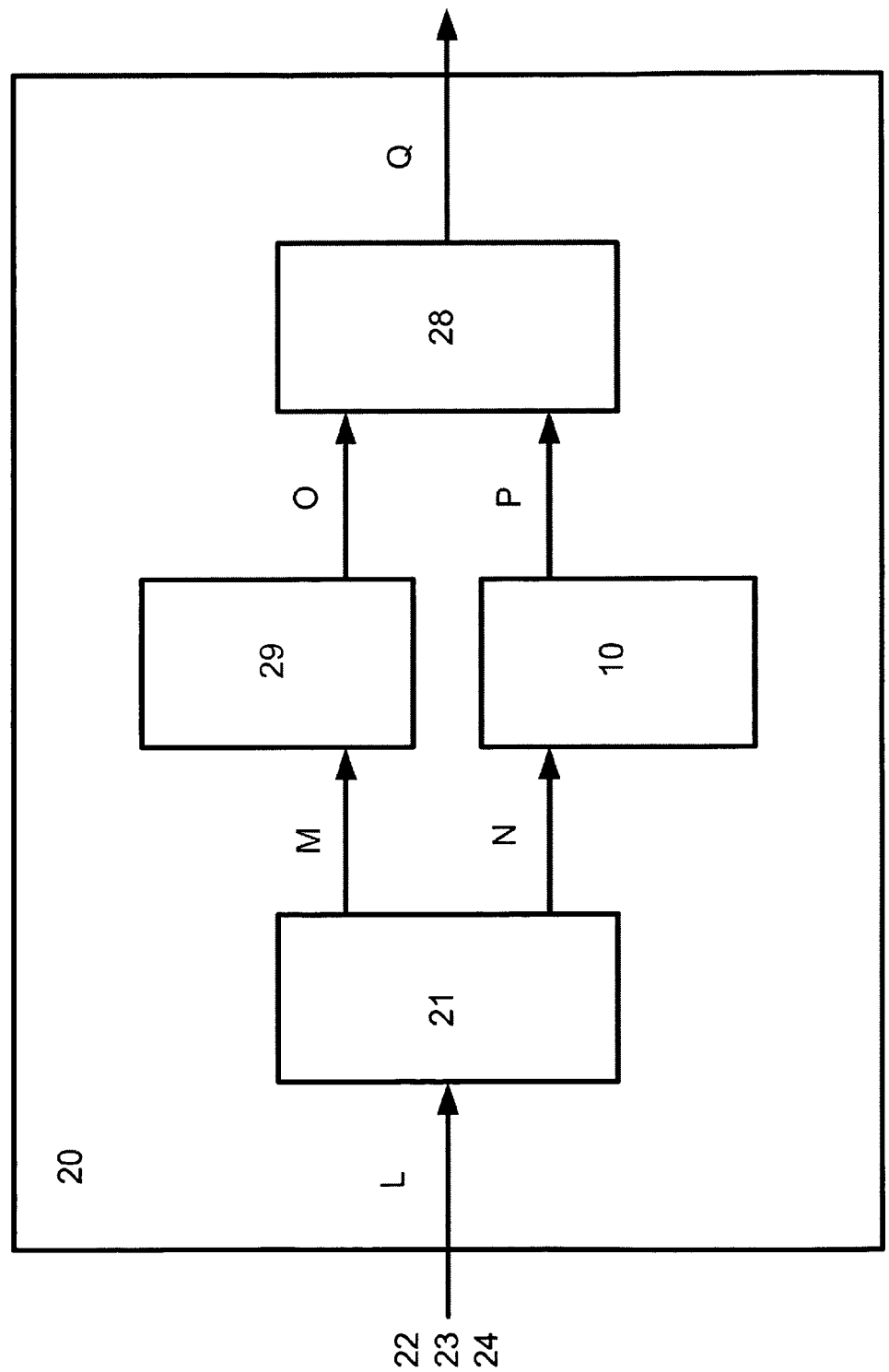
FIG. 2 is a block diagram of the system structure of the electronic control system.

The arrows in FIG. 1 represent data flow as follows:

A Tandem master cylinder brake pressure
   Wheel brake pressure
   ESP active
   ESP additional torque
   ABS active
   HBA active
   Vehicle speed
   Longitudinal vehicle acceleration
   Lateral vehicle acceleration
   Steering wheel angle
   Accelerator pedal travel
   Gear selection stage
   Stop light switch B Distance of object
   Relative speed of object
   Relative acceleration of object
   Status of object valid
   Status/type of object C Request seat adjustment left
   Request seat adjustment right
   Stop seat adjustment left
   Stop seat adjustment right D Seat occupation status left
   Seat occupation status right E Relative speed of object
   Direction, place of impact F Request accelerator pedal position G Request to close window(s)
   Request to close sliding roof H Collision alarm I Seatbelt force request left
   Seatbelt force request right
   Locking signal left
   Locking signal right J Belt buckle switch left
   Belt buckle switch right K Deceleration request In the control system 20, the input signals of the ABS/ESP brake system 11, of the ambience sensor system 12, the electric seat adjustment 13, the seat-belt tensioning device 19, and the resulting measured or derived internal and/or external signal quantities are used to calculate controlling interventions depending on risk potentials in a risk calculator 10 (FIG. 2). The determination of controlling interventions for actuators is based on the following input quantities of the vehicle units linked to the control system 20:

1. The vehicle longitudinal speed, vehicle longitudinal acceleration, the vehicle lateral acceleration, the steering angle, the wheel brake pressure, the brake pressure in the tandem master cylinder, the gear selector, the ESP additional yaw torque, and the status signals of brake light switch, accelerator pedal travel and the conditions of the ABS, ESP, HBA are determined by means of the ABS/ESP brake system 11 and supplied to the electronic control system 20.

2. As far as the ambience sensor system 12 is concerned, a remote area sensor furnishes the distance from the relevant object, a remote area sensor furnishes the relative speed with respect to the relevant object, a remote area sensor furnishes the relative acceleration to the relevant object, and the remote area sensor supplies the status signals related to the relevant object, and if necessary, information about the type of the detected relevant object (e.g. pedestrian, truck, and the like) and its condition (stands still, moves, and so on), sending the data to the control system 20.

3. The electric seat adjustment 13 sends the status signals about the occupation of the driver seat and the co-driver seat to the control system.

4. The control of the seat-belt tensioning devices 14 sends the status signals about the application of the belt buckles of the driver and co-driver seats to the control system.

As can further be seen in FIG. 1, the electronic control system 20 is additionally linked to the airbag control 15, a haptic accelerator pedal 16, the control of the window lifters and the sliding roof 17 and the display 18 of the vehicle.

In FIG. 2, the reference characters represent the following components and data:

10 Risk calculator
20 Electronic control system
21 Signal conditioning device
22 Ambience
23 Vehicle
24 Driver
28 Arbitration
29 Driver's request L Ambience Data, e.g.
   Distance of object
   Relative speed of object
   Relative acceleration of object
   Status of object valid
   Status/type of object Vehicle Data, Driver Data, e.g.
   Vehicle speed
   Longitudinal vehicle acceleration
   Lateral vehicle acceleration
   Steering wheel angle
   Accelerator pedal travel
   Stop light information
   Tandem master cylinder brake pressure
   Wheel brake pressure
   ABS active
   ESP active
   ESP additional torque
   HBA active
   Gear selector
   Seat occupation
   Belt buckle switch M Pedal Lever, Control Lever, Driver Condition, e.g.
   Tandem master cylinder brake pressure
   Wheel brake pressure
   Brake light switch
   Gear selector N Pedal Lever, Control Lever, Driver Condition, Driving Condition, Ambience Data, e.g.
   Vehicle speed
   Vehicle acceleration
   Steering wheel angle Yaw rate
Distance of object
Relative speed of object
Relative acceleration of object
Status of object valid
Status/type of object
ABS, HBA, ESP active
ESP additional torque
O Driver's Request, e.g.
  Tandem master cylinder pressure
  Derivative of dandem master cylinder pressure
  Wheel brake pressure
  Requested driver pressure
  Stop light switch
  Accelerator pedal travel
  Foot rpositioning time
  Derivative of accelerator pedal travel
  Gear selector
P Driving Signals, Controlling Intervention, Risk Information, e.g.
  Preset deceleration
  Seat adjustment
  Reversible seatbelt tensioning device
  Light
  Sliding roof
  Window lift
  Transmission
  Engine
  Steering
  Risk potential
Q Driving Signals, Controlling Interventions, e.g.
  Preset deceleration
  Seat adjustment
  Reversible seatbelt tensioning device (force, locking)
  Light
  Sliding roof
  Window lift
  Transmission
  Engine
  Steering
  Risk potential FIG. 2 shows the structure of the electronic control system 20, providing a signal conditioning device 21 into which the data/signals of vehicle 23, driver 24 and ambience 22 are read. The signals are subsequently conditioned so that they are available in the respectively correct unit. Besides, a sensor fusion of the remote and local area sensor can take place so that the following software modules 10, 28 and 29 will use only the fused sensor signal as a distance, speed and acceleration signal. A uniform consistent image of the ambience exists. This fused signal consequently represents the list of relevant objects (distance, type, relative speed . . . ) to which the risk calculator 10 will react. Further, a module 29 for detecting the driver's request is connected to the signal conditioning device 21. Specific characteristic quantities such as the time needed for repositioning the foot between the pedals, a deceleration requested by the driver, etc., are derived from input quantities which describe the driver's request with respect to steering the vehicle.

In the risk calculator 10 connected to the signal conditioning device 21, the accident likelihood is determined on the basis of the input data with the aim of driving the actuators provided in the vehicle.

In a particularly favorable embodiment, the following data can be used as input quantities to determine the current risk situation (risk potential and direction):

information about the distance of objects (such as vehicles, immobile obstacle etc.) in vehicle coordinates and in relation to the predicted collision range of the own driving trajectory; their relative speeds e.g. by means of distance sensors or by means of extension by local area sensors, in particular pre-crash sensors assessment of the range of vision, e.g. by means of the distance sensors contact sensors on the vehicle (e.g. glass fiber for contact force, acceleration sensors) for detecting e.g. a crash with a pedestrian classification of the detected objects (pedestrians, expansion of the objects, . . . ) e.g. by means of camera and image processing information about the course of the road (geometry data, curve radii, track width, number of tracks, . . . ), directional traffic signs and traffic regulation signs telematic information (traffic jam information via TMC (Traffic Message Channel) or GSM (Global Standard for Mobile Communication, road condition information, . . . )

driving dynamics sensors and models for determining the vehicle state from wheel speed, yaw rate, longitudinal acceleration, lateral acceleration, steering angle, steering angle speed, sideslip angle, ESP additional torque and/or coefficient of friction).

actuating conditions of the control devices in the vehicle sensors for the detection of occupants and classification (e.g. OOP, child seat detection, driver's condition such as tiredness, . . . )

information about the potential coefficient of friction.

Description of the Function of the Risk Calculator

The risk calculator 10 mainly executes three process steps. These steps are 1. calculation of characteristic factors related to driving dynamics (time to collision ttc, necessary deceleration to avoid a collision, resulting vehicle acceleration, speed of the vehicle or object ahead)
2. calculation of risk potentials
3. calculation of the driving signals (universally valid quantity—not the actual actuator driving signal) due to the risk potentials.

In this arrangement, a level of abstraction is defined which assesses the situation in an appropriate manner. This level is realized by the risk potentials. The risk potential is a dimensionless quantity ranging between 0 and 100. The higher the risk potential is, the more dangerous the situation. The actuators are driven only due to inquiries of the risk potentials with respect to threshold values. Several risk potentials can be combined in order to activate an actuator. This means that the state assessment initially comprises the selection or the proportioning of the actuation of the actuators only to a limited extent (see special risk potentials hereinbelow) or not at all (see universally valid risk potentials hereinbelow). It becomes apparent from the above explanations that a defined situation is assessed by several risk potentials. This allows a more comprehensive assessment of the situation. There are risk potentials which assess the situation irrespective of the actuators. For example, there may be a risk potential assessing the longitudinal-dynamics driving condition. Accordingly, there is a universally valid risk potential describing the driving condition related to lateral dynamics.

In contrast to these universally valid risk potentials, there are special risk potentials which are set up for defined actuators. These risk potentials take the fact into account that different actuators have different activation times. This means that the same situation is comparatively more critical for an actuator having a long activation time than for an actuator having a short activation time.

There are two different groups of risk potentials:
1. universally valid risk potentials independent of actuators
2. special risk potentials depending on actuators.

1 Description of the Risk Potentials

The risk potential is a dimensionless quantity ranging between 0 and 100. It describes the danger of a defined situation. In this respect, a risk potential of 0 means no risk, and a risk potential of 100 implies a very high risk. A risk potential of 100 does not imply that an accident will automatically happen. At what time the risk potential will reach the values 0 or 100, respectively, is not defined in a universally valid manner and, therefore, is definable individually for the respective case of application. Depending on the risk potentials defined in the control system, the actuators (e.g. brake, rev. seat-belt tensioning devices, seat adjustment, etc.) are driven.

As this occurs, individual risk potentials are combined and used to drive an actuator.

The activation and the degree of this activation is combined and used to drive an actuator.

The activation and the degree of this activation are safeguarded by an inquiry about threshold values of the risk potential or the risk potentials, respectively.

2 Universally valid risk potentials irrespective of actuators 2.1.1 Longitudinal-dynamics risk potential, depending on ambience sensor information out of the ambience sensor system 12 (dp_xdyn_sen)

The assessment of the longitudinal-dynamics driving situation is realized by way of a longitudinal-dynamics risk potential on condition that the speed is higher than a minimum speed. This is achieved by using a Fuzzy interference system. Fuzzy logic permits rendering human behavior patterns or human causal knowledge mathematical and, hence, making it capable of being imitated by computers. Subsequently, the traffic situation and the driving condition are classified by means of membership functions. Thus, the difference between nominal and actual distance is evaluated as an input quantity related to the nominal distance sx_rel_des.

$$\frac{sx\_rel\_des - sx\_rel}{sx\_rel\_des} \quad (1)$$

The nominal distance depends functionally on the own driving speed vx and is determined according to the relation $$sx\_rel\_des = sx\_rel\_desmin + t\_ttc\_des * vx \quad (2)$$

with
sx_rel_des=nominal distance
sx_rel_desmin=minimum nominal distance
t_ttc_des=time until accident
vx=driving speed in the longitudinal direction.

Figure 4:
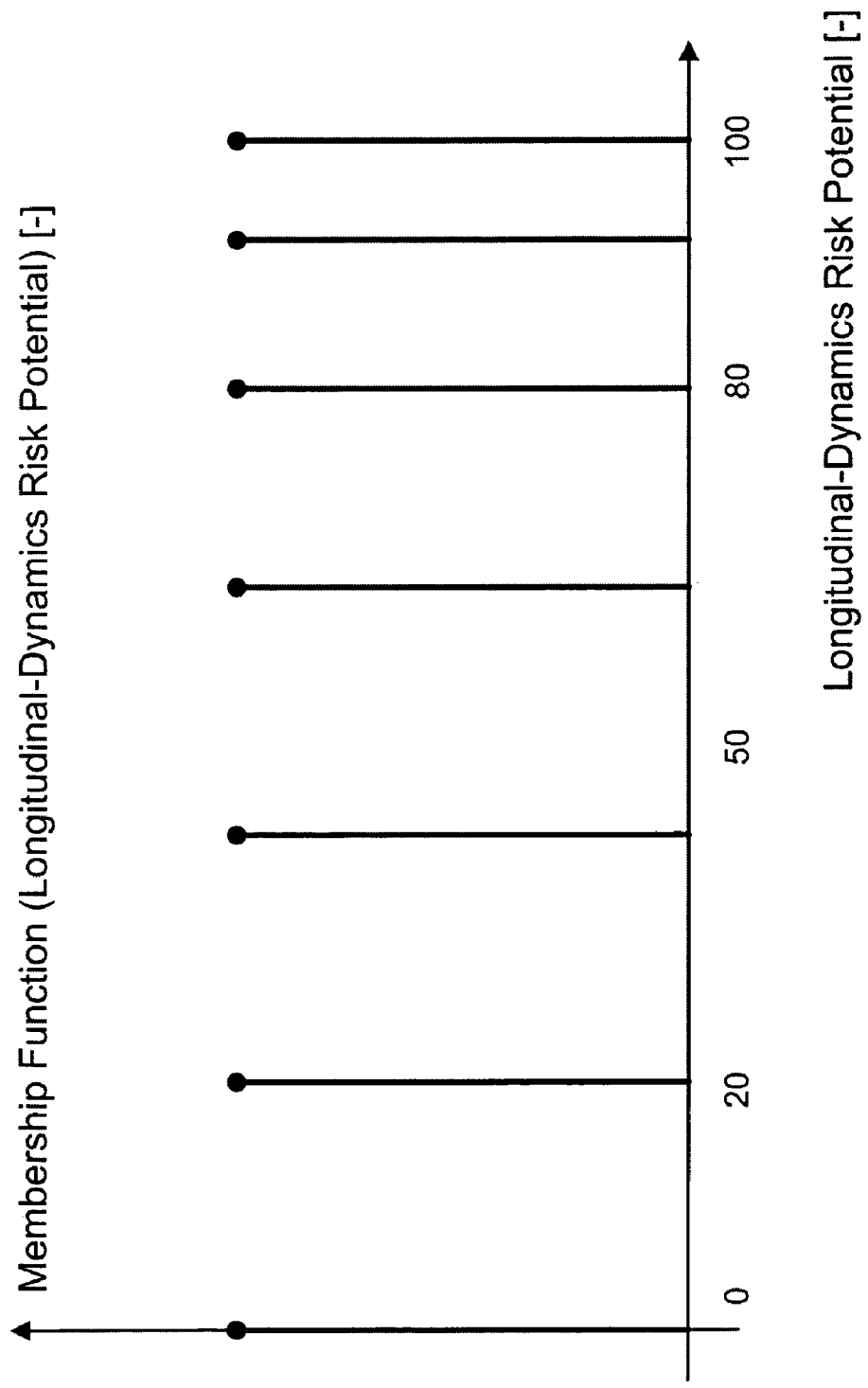
FIG. 4 shows a categorization of the controlling interventions (output quantities) by means of membership functions (MF: Membership Function, Singletons are used in the example)

The relative speed as a second input quantity is likewise categorized by corresponding membership functions. The output quantity—that means the longitudinal-dynamics risk potential—is also categorized by means of membership functions (suitably Singletons (FIG. 4) are used).

Figure 3:
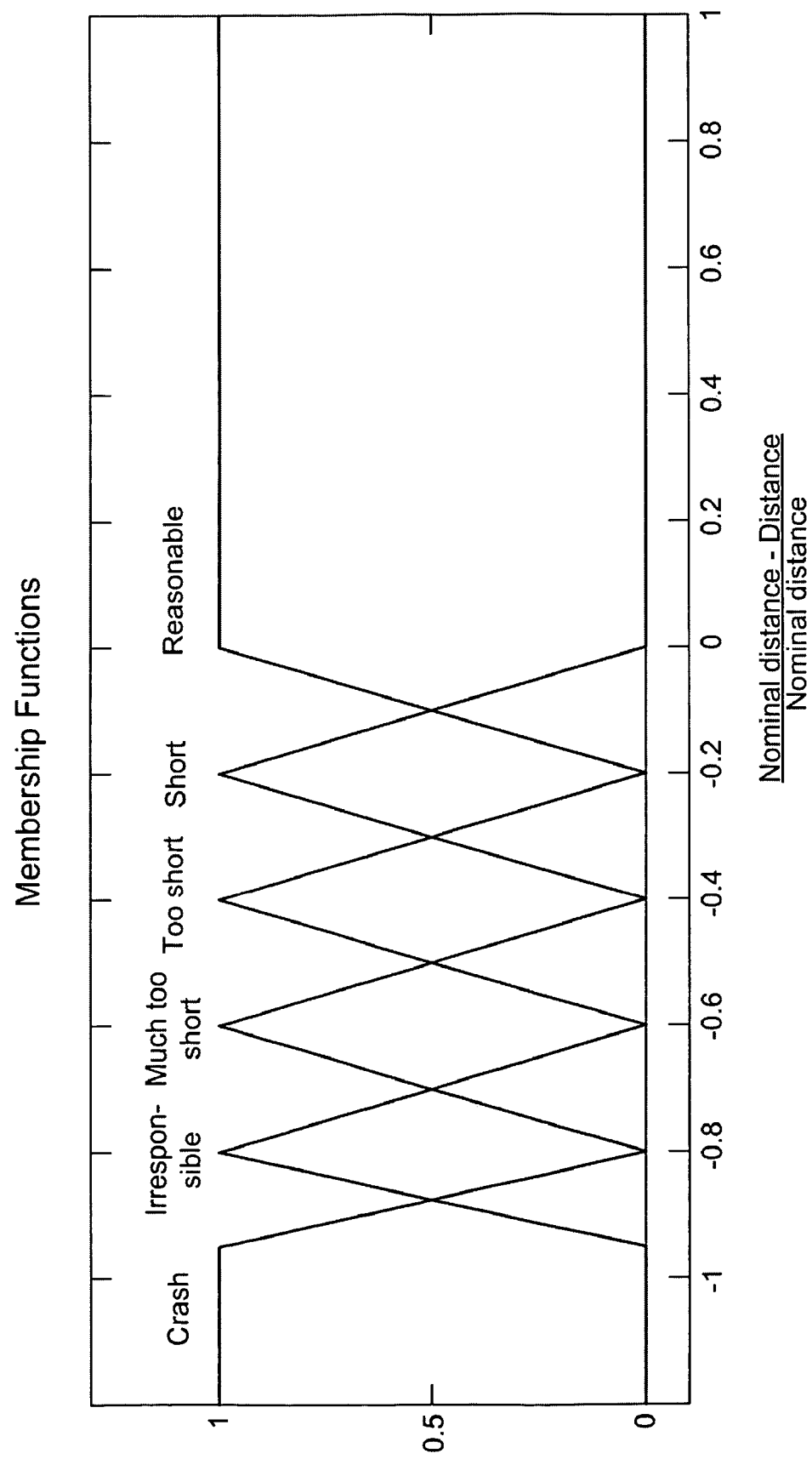
FIG. 3 is a simplified categorized illustration of the difference between the nominal distance and actual distance from traffic participants.

FIG. 3 shows the membership functions for the first input quantity, that means for the difference between nominal and actual distance sx_rel related to the nominal distance sx_rel_des. This input quantity is classified by means of six membership functions.

The so assessed input quantities are evaluated by means of simply definable logical operations, 'if . . . , then . . . '
relations (rules) and then result in a share in the total risk potential for each individual rule, depending on the degree of accomplishment. The resulting risk potential shows from the accumulation of the individual partial implications.

Figure 5:
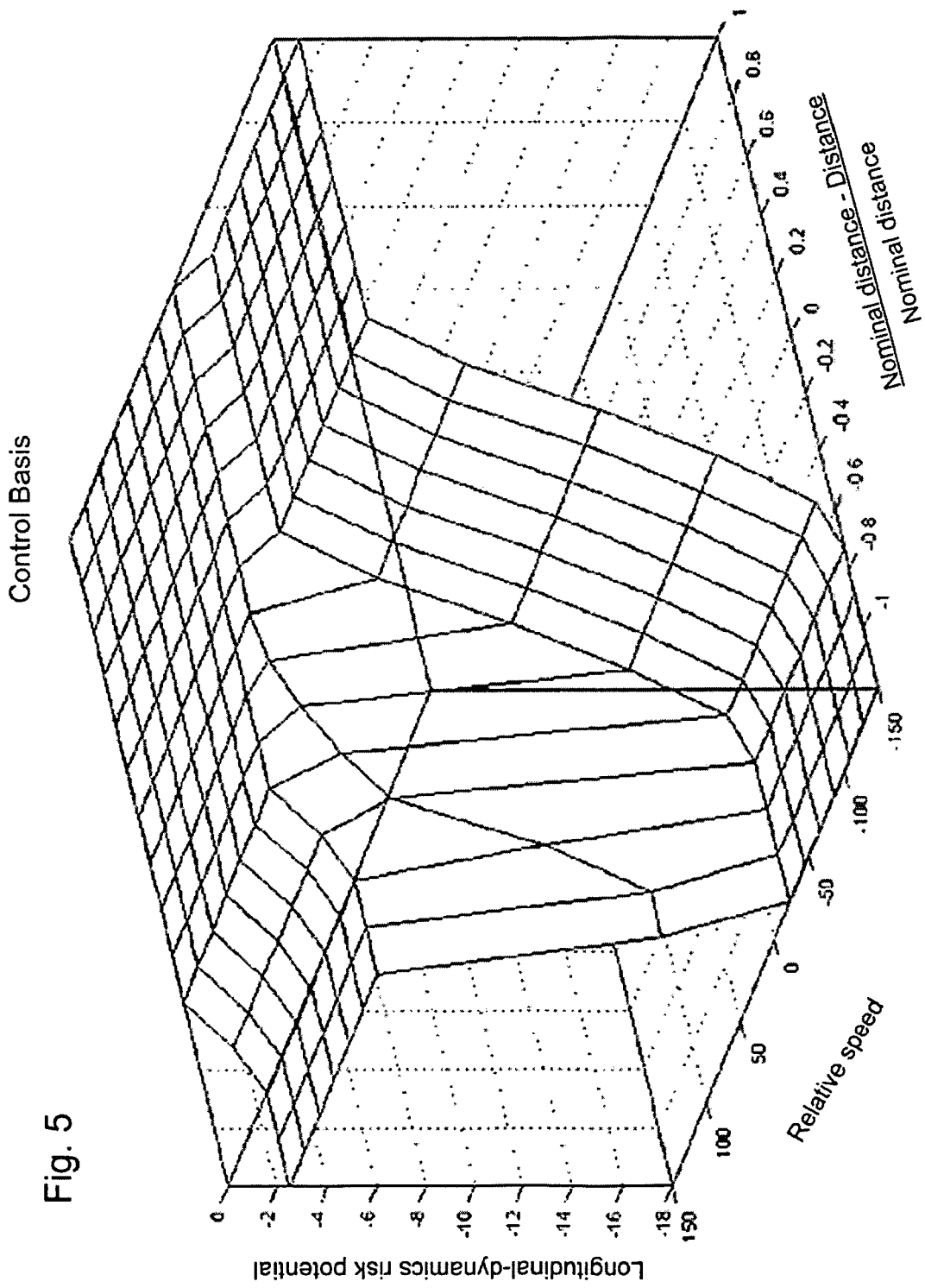
FIG. 5 is a schematic view of the control basis for the controlling intervention nominal deceleration $a_{noml}$ depending on the nominal distance, actual distance and relative speed.

FIG. 5 shows as an example the control basis which originates based on the evaluation of the Fuzzy system. The longitudinal-dynamics risk potential is plotted as a function of the input quantities 'relative speed' and the difference between nominal and actual distance related to the nominal distance.

2.2 Longitudinal-dynamics risk potential, depending on ambience sensor information (dp_xdyn_sen_1)

The longitudinal-dynamics driving situation is assessed by way of another longitudinal-dynamics risk potential. This risk potential is calculated as follows:

$1^{st}$ condition: The vehicle speed must exceed a threshold value (no risk potential is calculated during maneuvering.)

$2^{nd}$ condition: The relative speed with respect to the detected object must be lower than a negative threshold.

This risk potential sets the deceleration which is necessary to prevent a collision in relation to a component of the deceleration that is maximally transmittable onto the road. The rule of calculation reads:

$$dp\_xdyn\_sen\_1 = \min\left(100\left(\frac{a_{nec}}{-a * \mu_{max} * g} * 100\right)\right) \quad (5.3)$$

with e.g. α=0.4.

2.3 longitudinal-dynamics risk potential, depending on driving dynamics information of the ABS function (dp_xdyn_abs)

This risk potential is 0 as long as no ABS braking operation takes place. If, however, an ABS braking operation is performed, this risk potential is 100.

dp_xdyn_abs=100 for ABS braking active, 0 for ABS braking inactive (5.4)

2.4 longitudinal-dynamics risk potential, depending on driving dynamics information of the brake assist function (dp_xdyn_hba)

This risk potential is 0 as long as no braking supported by brake assist (classical hydraulic brake assist HBA, not the extended brake assist BA+) takes places. If, however, braking is carried out with the support of the brake assist, this risk potential is 100.

dp_xdyn_hba=100 for braking with HBA assist for braking without HBA assist or no braking (5.5)

2.5 lateral-dynamics risk potential, depending on driving dynamics information of the ESP function (dp_ydyn_esp)

This risk potential is 0 as long as no ESP intervention takes place. If, however, the ESP intervenes into driving dynamics, this risk potential is 100.

dp_xdyn_esp=100 for ESP interventions active 0 for ESP interventions inactive (5.6)

This definition is only a first embodiment. A finer grading of this risk potential is achieved if the information about the additional torque m_add_esp in relation to a maximum at defined coefficient-of-friction conditions is used rather than the ESP on/off flag, which maximum must be generated to stabilize the vehicle again.

2.6 actuator-dependent, special risk potentials special risk potential for the actuation of the reversible seat-belt tensioning device, depending on the ambience sensor information (dp_msb_sen)

This risk potential is calculated as follows:

1. condition: The vehicle speed must exceed a threshold (no risk potential is calculated during maneuvering)

2. condition: The relative speed with respect to the detected object must be negative.

The actual calculation of the risk potential forms the quotient of currently determined time to collision ttc from the sensor information and the average activation time of the reversible seat-belt tensioning device.

This quotient indicates how much time still remains to fully activate the actuator on an average. The rule of calculation is as follows:

$$dp\_msb\_sen = 100 * \min\left(1, \max\left\{1, \left(2 - \frac{t_{tc}}{t_{msb\,activate}}\right)\right\}\right) \quad (5.7)$$

As an extension of this relation, it may be arranged for that the above calculated risk potential is limited to a defined value depending on the quotient of the necessary deceleration and the maximum deceleration that can be transmitted to the road. This assesses the possibility of the driver to brake before the accident happens, meaning, to modify the state variables speed and acceleration. These constant state variables are the prerequisite in the calculation of the time to collision, as used in the way described above.

Further, it may be arranged for to realize the risk potential depending on the quotient of time by a defined lateral offset and to limit the time to collision to a defined value. This assesses the possibility of the driver to avoid the obstacle. The supplement by the above-described extensions leads to a more realistic assessment of the actual risk because the possibilities of influencing the current driving situation of the driver are taken into account.

Figure 8:
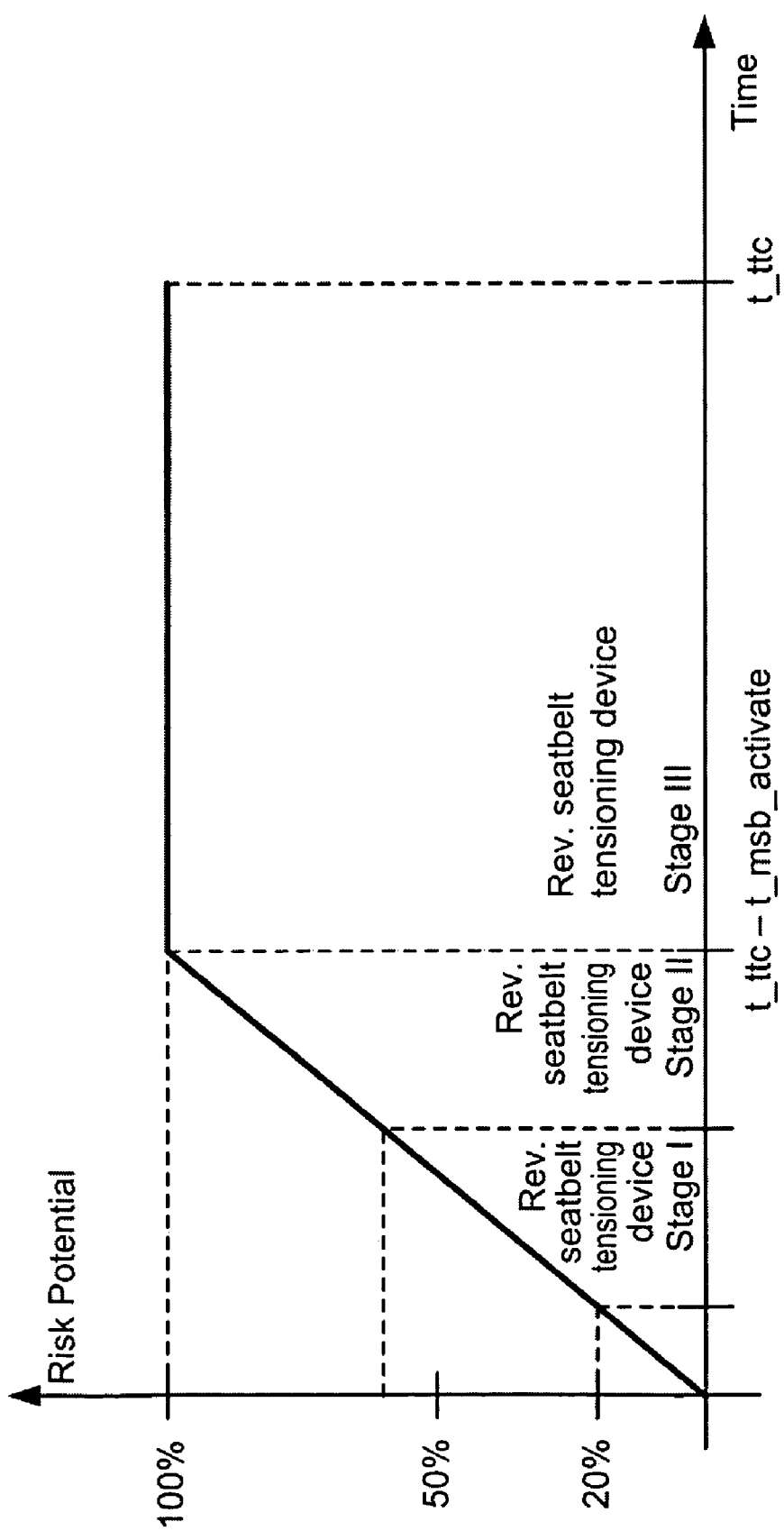
FIG. 8 is a schematic view of the activation of a seat-belt tensioning device.

FIG. 8 shows herein the stepwise activation of a seat-belt tensioning device depending on the risk potential, e.g. 20%, 60% and 100%. Stage I of the seat-belt tensioning device is activated at 20% of the risk potential, stage II is activated at 60%, and stage III at 100%. At stage I the belt slack is removed, at stage II the seat-belt tensioning device is preloaded and locked, at stage III the occupant is positioned, that means the seat-belt tensioning device is tensioned at maximum force and locked.

The activated seat-belt tensioning device remains in its activated stage until the risk potential is below a threshold which no longer represents a risk and the resultant vehicle acceleration is below a threshold and a defined period of time has lapsed.

2.7 Special risk potential for the actuation of the seat adjustment, depending on the ambience sensor information (dp_seat_sen)

This risk potential is calculated according to the same calculation regulation as the risk potential dp_msb_sen. For the activation time of the actuator, only the average activation time is put up now (instead of tmsb_activate, put up tseat_activate), which is necessary for readjusting the seat. The supplements, as described in the calculation of the risk potential dp_msb_sen, are applicable also in this case.

2.8 Special risk potential for the actuation of the window and/or sliding roof adjustment, depending on ambience sensor information (dp_wind_sen/dp_roof_sen)

This risk potential is calculated according to the same calculation regulation as the risk potential dp_msb_sen. For the activation time of the actuator, only the average activation time is put up now (instead of tmsb_activate, put up twind_activate or troof_activate, respectively), which is necessary to close the window or the sliding roof, respectively. The supplements, as described in the calculation of the risk potential dp_msb_sen, are applicable also in this case.

The advantage of the invention involves that limiting quantities can be calculated, assessed and categorized independently of one another. By means of the different risk potentials, the general view of the current risk situation can be described by simple individual connections. The general view of the current risk situation can be seen in the evaluation of the single risk potentials.

The reliability of the data used for determining the above-mentioned controlling interventions and the complexity of the situation do not allow completely autonomous interventions in driving-dynamics-related interventions in the vehicle. Therefore, the controlling interventions determined by way of the risk calculator can be realized to a respectively suitable degree only after an assessment in the arbitration unit 28 (FIG. 2) with the driver's request determined in the driver request module 29 (FIG. 2), such as the driver action and other quantities describing the current driver situation.

Figure 6:
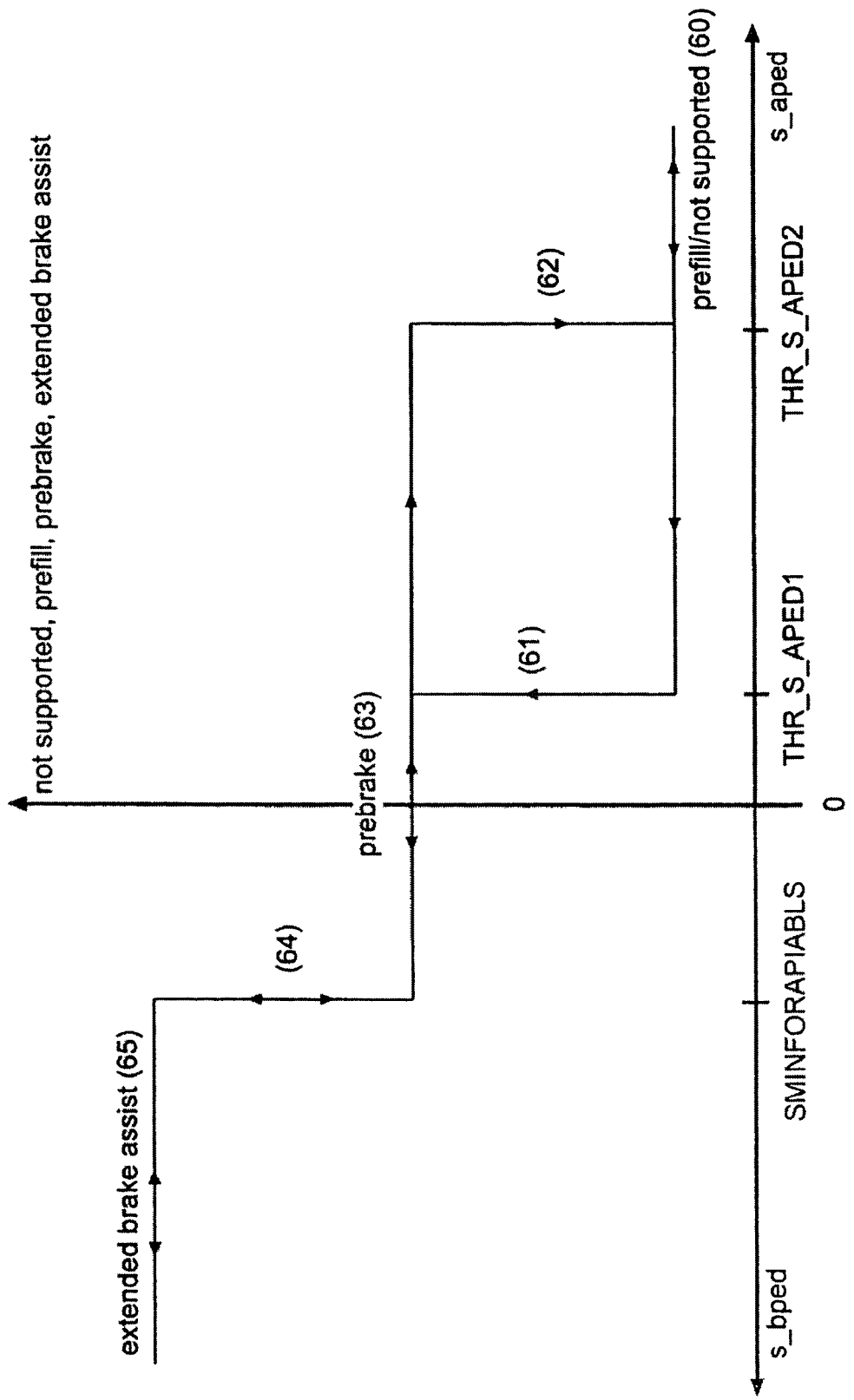
FIG. 6 is a schematic view of the state transitions prefill, prebrake, extended brake assist.

To this end, a state machine utilizes the characteristic quantities supplied by the driver request module and, depending on these quantities, releases e.g. deceleration specifications of the risk calculator 10. Substantially the foot movement of the driver is evaluated. This movement allows conclusions about how dangerous the driver estimates the same situation to be or whether he has detected a critical situation at all. Only if the driver confirms this critical situation will brake pressure develop irrespective of the driver. As FIG. 6 shows, a distinction is made between four stages:

1. not supported: The driver indicates his desire to accelerate by a positive time gradient on the acceleration pedal (s_aped=accelerator pedal travel). Even if the risk calculator detects a critical situation, brake pressure is not built up autonomously in this state pmax=0 bar.

2. prefill: This level defines a state where the deceleration request of the driver can only be determined to a limited extent or does not yet exist. The driver must touch the accelerator pedal s_aped in this state. There are two subordinated states: a) prefill 1: The calculated risk potential has a time gradient which lies above the defined threshold. The driver does not change his accelerator pedal position s_aped. This situation is interpreted as an extreme aggravation of the risk situation so that a brake pressure of a maximum of p1max=k1 bar is admitted even without active confirmation by the driver. This causes application of the brake pads.

b) prefill 2: When the driver confirms the critical situation by leaving the accelerator pedal (negative time gradient on the accelerator pedal), a maximum brake pressure of p2max>P1max is allowed.

Figure 7:
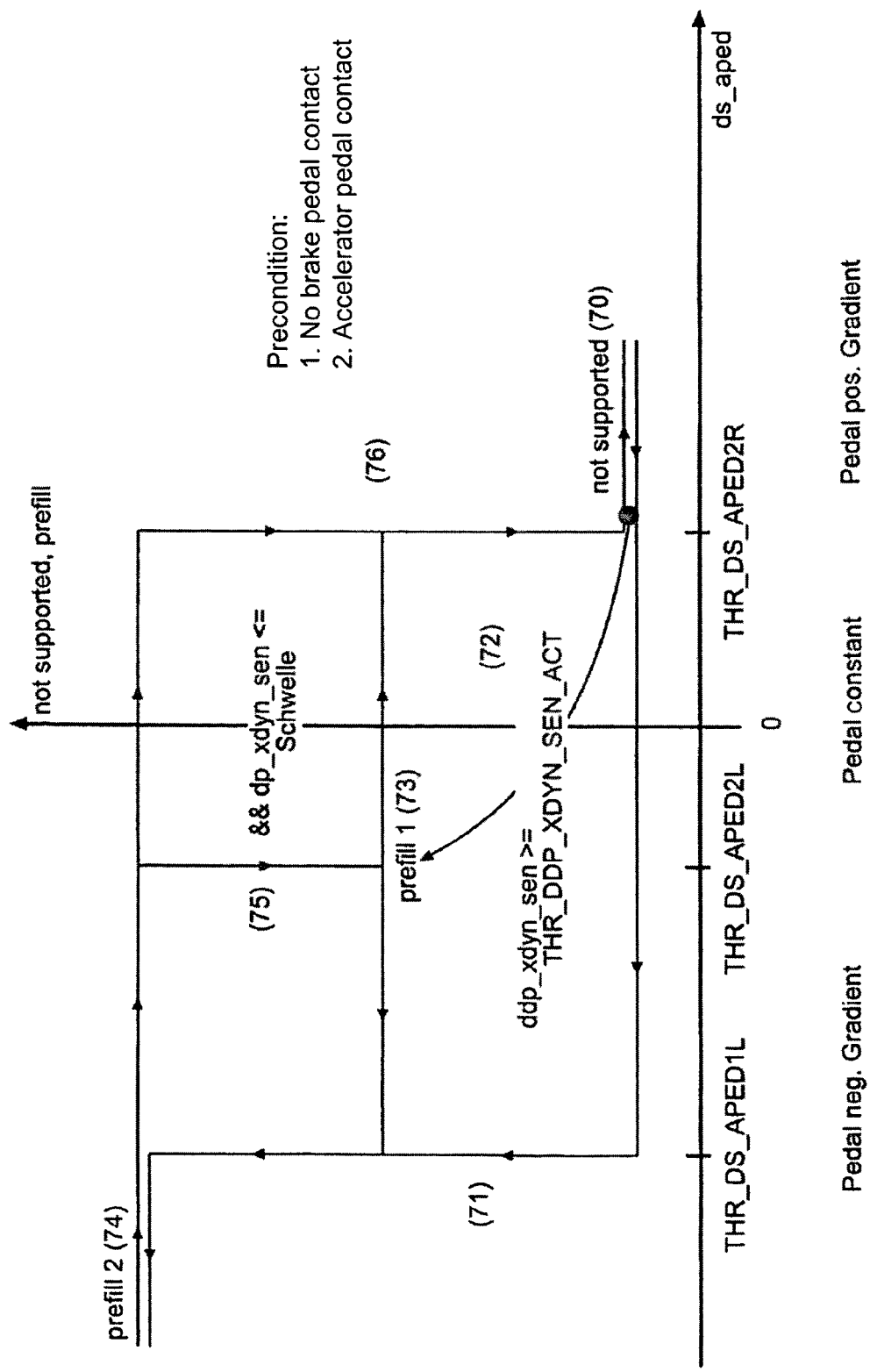
FIG. 7 is a schematic view of the state transitions prefill.

The transitions from prefill 1 to prefill 2 are illustrated in detail in FIG. 7.

3. prebrake: The driver has neither operated the accelerator pedal nor the brake pedal in this state. Therefore, this state 0 is interpreted as a limited deceleration request. The maximum deceleration is thus raised to approximately the ACC level (0.3 g) so that a maximum brake pressure of p3max>p2max can develop.

4. extended brake assist: With the transition to this state, the driver confirms his deceleration request by applying the brake pedal (threshold: brake light switch BLS). When further conditions are fulfilled now, the brake pressure predetermined by the risk calculator is released depending on the degree of fulfillment.

These conditions are classified as follows:
An emergency situation is derived from
a) the time variation of the brake pressure and the brake light information and
b) the time variation of the risk potentials.

When this emergency situation is detected, the brake pressure calculated by the risk calculator is conducted entirely as a nominal value to the brake system. The driver receives maximum support. If, however, no emergency situation is detected, a characteristic factor is determined representative of the extent of the driver's braking request. This factor is composed of three components being considered in a defined weighting ratio.
a) Ratio between the brake pedal travel and the maximum of the brake pedal travel, which depends on the pressure in the system (represented by the wheel brake pressure). This is necessary because the driver senses the brake pressure in the system, should the system be prefilled.
b) Ratio between the brake pedal speed and the maximum of the brake pedal speed. This maximum value is independent of the degree of the system's prefilling in approximation.
c) Factor which assesses the time of repositioning the foot between the accelerator pedal and the brake pedal.

The driver is given in this state a brake assist adapted to the situation by way of releasing the brake pressure that is determined in the risk calculator.

As FIG. 6 shows, the deceleration assist of the driver depends on the accelerator pedal travel s_aped and the brake pedal travel s_bped. In the direction of the arrow of the respective axes s_aped and s_bped, an increase of the positive or negative acceleration of the vehicle is assumed. When the driver adopts the state prefill/not supported 60, the arbitration unit is unable to release brake pressure, to release a brake pressure which causes application of the brake pads, or a brake pressure which causes low deceleration of the vehicle. When the driver leaves the accelerator pedal and values fall below the threshold THR_S_APED1, he shows the desire to decelerate the vehicle, and the state changes via the path 61 to prebrake 63. When the driver applies the accelerator pedal in the state prebrake, the threshold THR_S_APED2 must be overcome in order that the state changes via the path 62 to prefill/not supported 60. When the system adopts the state prebrake 63 and the driver applies the brake pedal until a threshold SMINFORAPIABLS is exceeded, the state prebrake will change via path 64 into the state extended brake assist 65.

FIG. 7 represents the transitions between the states not supported, prefill 1, and prefill 2. ds_aped designates the accelerator pedal speed in this respect. In FIG. 7, a positive gradient of the accelerator pedal is assumed starting from 0 in the direction of the arrow, that means the accelerator pedal is applied by the driver and the vehicle accelerates; starting from 0 in opposition to the direction of arrow a negative gradient is assumed, i.e. the driver withdraws the accelerator pedal and the vehicle brakes by using the engine. When the state not supported 70 is adopted and the gradient of the risk potential ddp_xdy_sen exceeds the threshold value THR_D-DP_XDYN_SEN_ACT, a change is made via path 72 into the state prefill 1 73. When the state not supported 70 is adopted and the driver leaves the accelerator pedal, values dropping below the threshold THR_DS_APED1L, a change is made via path 71 to the state prefill 2 74. Starting from the state prefill 2 74, a change is made via path 75 into the state prefill 1 73 under the condition that the gradient of the accelerator pedal travel is higher than the threshold THR_DS_APED2L and the risk potential is lower than a threshold. Likewise, the state prefill 2 74 is left via the path 76 when the gradient of the accelerator pedal travel is higher than the threshold THR_DS_APED2R.

The state prefill 1 73 can change via the path 71 into the state prefill 2 74 when the gradient of the accelerator pedal travel is lower than the threshold THR_DS_APED1L.

The state prefill 1 73 can change via the path 76 into the state not supported 70 when the gradient of the accelerator pedal travel is higher than the threshold THR_DS_APED2R.

The conditions of transition can be refined when the vehicle acceleration is evaluated as an additional input quantity. The advantage of this extension resides in a consideration of an accelerated driving condition over a long period of time, which is not available when the application of the accelerator pedal is evaluated. The driver's request can be realized better in this way.

Figure 9:
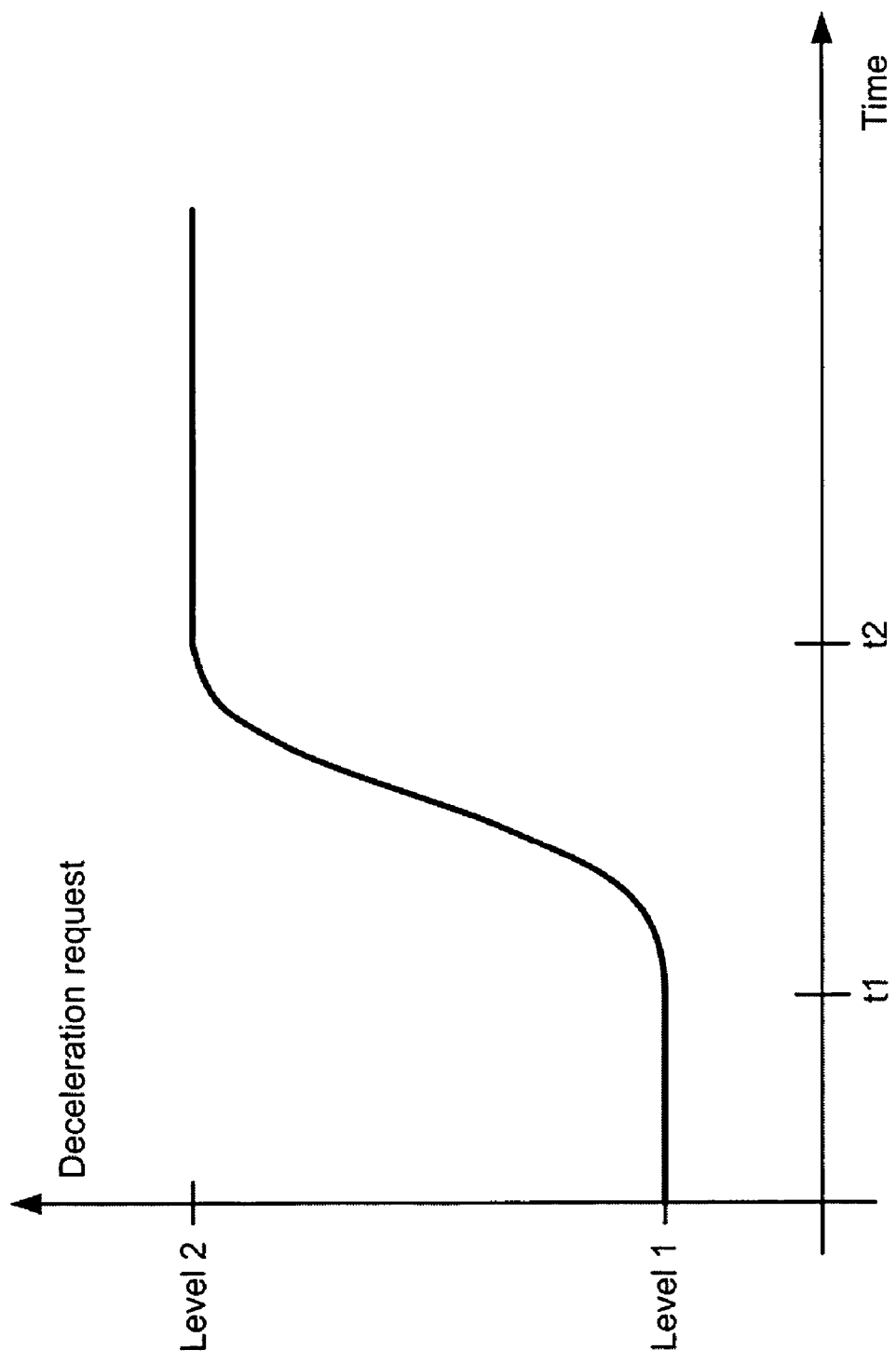
FIG. 9 is a schematic view of a sigmoid transition function.

Transitions are thus achieved which are configured with minimal jerks in a favorable manner (e.g. FIG. 9). In this arrangement, a sigmoid transition function is used to pass the current adjustment level over into the new level. As an embodiment, a segment of the sine function or its approximation can be utilized by way of a progressive development.

The driver maintains the control in every situation and can overrule at least the braking interventions by way of application of the accelerator pedal.

The invention claimed is:

1. An electronic control system for a vehicle, comprising a driver request module for determining characteristic quantities with respect to the driver's request from data at least representative of pedal travels, movements of the foot changing between the pedals and the brake pressure of the brake system, and a risk calculator for determining risk potentials from predefined and current vehicle data and additional data, the risk calculator performing at least an assessment of the condition of danger of the vehicle and the occupants in the vehicle and, in case of need, outputs controlling interventions graded according to the risk potential for controlling actuators, and an arbitration unit for receiving outputs from the risk calculator and performing an assessment with the data determined in the driver request module with regard to the characteristic quantities determined in the driver request module depending on an action influencing the driving dynamics of the vehicle brought about by the controlling interventions and, depending on the result of the assessment, releasing the graded controlling interventions to a limited extent, releasing them in their entirety, or blocking them.

2. The electronic control system as claimed in claim 1, wherein the driver request module is capable of determining a repositioning movement of the driver's foot between an accelerator pedal and a brake pedal from accelerator pedal travel information and brake light information as input quantities.

3. The electronic control system as claimed in claim 2, wherein the driver request module is capable of determining the time of repositioning the foot between the pedals from the input quantities.

4. The electronic control system as claimed in claim 1, wherein the driver request module (29) is capable of supplying the characteristic quantities determined to the subsequent arbitration unit.

5. The electronic control system as claimed in claim 4,
wherein the driver request module is capable of supplying further characteristic quantities to the subsequent arbitration unit (28).

6. The electronic control system as claimed in claim 1,
wherein the risk calculator is capable of calculating risk potentials from data relating to at least the vehicle longitudinal speed, the vehicle longitudinal acceleration, the vehicle lateral acceleration, the distances from relevant objects and state data about driving dynamics controllers, said risk potentials, at least in dependence on determined dynamics risk characteristic quantities, producing controller outputs graded in their effect and dependent on the determined risk potential for applying brakes, for adjusting reversible occupant protection means and for adjusting devices that change the relative position between occupant protection means and vehicle occupants.

7. The electronic control system as claimed in claim 1,
wherein the risk calculator (10) calculates risk potentials from data representing at least the vehicle longitudinal speed, the vehicle longitudinal acceleration and the vehicle lateral acceleration, and at least one of the following quantities: the distance from relevant objects in the local area, the distance from relevant objects in at least one remote area, a derivative of at least one of the afore-mentioned quantities and state data about at least one driving dynamics controller; said risk potentials, at least in dependence on determined dynamical-risk characteristic quantities, producing controller outputs for closing vehicle openings.

8. The electronic control system as claimed in claim 1,
wherein, depending on the risk potential determined, the risk calculator (10) further generates signals to warn the driver of the vehicle or to guide the driver to a reaction that is adapted to the current vehicle situation and passes on these signals directly to the actuators (18, 16) for realization.

9. The electronic control system as claimed in claim 8,
wherein the warnings are given by means of a vehicle part that is in contact with a body part of the driver.

10. The electronic control system as claimed in claim 8,
wherein the directions are given by means of a modified control force on at least a pedal or the steering wheel.

11. The electronic control system as claimed in claim 1,
wherein the risk calculator (10) calculates risk potentials from data representing at least the vehicle longitudinal speed, the vehicle longitudinal acceleration and the vehicle lateral acceleration, and at least one of the following quantities: the distance from relevant objects in the local area, the distance from relevant objects in at least one remote area, a derivative of at least one of the afore-mentioned quantities and state data about at least one driving dynamics controller; said risk potentials, at least in dependence on dynamical-risk characteristic quantities, producing information for a non-reversible occupant protection means and for the control systems of the non-reversible occupant protection means.

12. The electronic control system as claimed in claim 1,
wherein the risk calculator determines different risk potentials and combines them for producing the controlling interventions.

13. The electronic control system as claimed in claim 1,
wherein the risk calculator determines risk potentials by way of a fuzzy system and/or in a driving-dynamics model.

14. The electronic control system as claimed in claim 1,
wherein the risk calculator determines risk potentials by way in a driving-dynamics model.

15. The electronic control system as claimed in claim 12,
wherein the risk calculator determines general risk potentials and special risk potentials, with the general risk potentials being actuator-independent and the special risk potentials being actuator-dependent.

16. The electronic control system as claimed claim 1,
wherein the arbitration unit includes a state machine which arbitrates the characteristic quantities provided by the driver request module (29) including at least one of the following quantities: brake pedal travel, brake pedal speed, accelerator pedal travel, accelerator pedal speed, the time of repositioning the foot between the accelerator pedal and the brake pedal, the condition (on/off) of a brake light, measured brake pressures of the brake system, calculated brake pressures of the brake system, the acceleration of the vehicle, the risk potentials determined by the risk calculator, and derivatives of the afore-mentioned quantities, with respect to the braking interventions determined by the risk calculator.

17. The electronic control system as claimed in claim 16,
wherein the arbitration unit determines a braking intervention depending on the characteristic quantities accelerator pedal travel, brake pedal travel and at least one of the following quantities: brake pressures, brake pressure changes, acceleration, brake light information of the driver request module representative of the driver's request, and wherein the arbitration unit derives levels for maximum decelerations according to threshold values of these characteristic quantities and the risk potentials.

18. The electronic control system as claimed in claim 17,
wherein arbitration unit establishes a characteristic factor defining the degree of the braking request of the driver depending on the weighting of the following conditions:
a) ratio of the brake pedal travel to the maximum of the brake pedal travel,
b) ratio of brake pedal speed to the maximum of the brake pedal speed;
c) factor assessing the time of repositioning the foot from the accelerator pedal to the brake pedal.

19. The electronic control system as claimed in claim 17,
wherein arbitration unit establishes a characteristic factor defining the degree of the braking request of the driver depending on the weighting of the following conditions:
a) ratio of a brake pressure requested by the driver to the average maximum of an emergency brake pressure;
b) ratio of the time gradient of the brake pressure requested by the driver to the average time gradient of a maximum of an emergency brake pressure;
c) factor assessing the time of repositioning the foot from the accelerator pedal to the brake pedal.

20. The electronic control system as claimed in claim 17,
wherein the arbitration unit determines an emergency brake situation from the time variation of the brake pressure and the brake light information and the time variation of the risk potential.

21. The electronic control system as claimed in claim 20,
wherein when the emergency brake situation is detected, the deceleration calculated by the risk calculator is conducted entirely as a nominal value to the brake actuators.

22. A method for determining at least one driver-independent intervention into a vehicle system, including the steps of determining a driver's request in a driver request module including characteristic quantities with respect to the driver's request, from data being at least representative of pedal travels, movements of a foot changing between pedals, and brake pressure of a brake system, determining a risk potential in a risk calculator from predefined and current vehicle data and additional data, including ambience data and driver data, and optionally data of persons inside and outside the vehicle, performing at least an assessment of the condition of danger of the vehicle and the occupants of the vehicle within the risk calculator, depending on the assessment and on further criteria, supplying outputs controlling interventions graded according to the risk potential to an arbitration unit for the purpose of controlling actuators, and performing an assessment in said arbitration unit with the data determined in the driver request module with regard to the driver' request depending on an action influencing the driving dynamics of the vehicle brought about by the controlling interventions, and initiating, from the arbitration unit, graded controlling interventions to a limited extent, releasing them without limitation or completely blocking them depending on the result of the assessment.

* * * * *